US010449825B2

(12) United States Patent
Woo et al.

(10) Patent No.: US 10,449,825 B2
(45) Date of Patent: Oct. 22, 2019

(54) AIR CONDITIONING SYSTEM

(71) Applicant: HANON SYSTEMS, Daejeon (KR)

(72) Inventors: Sang Gu Woo, Daejeon (KR); Yong Nam Ahn, Daejeon (KR); Sung Je Lee, Daejeon (KR); Se Min Lee, Daejeon (KR); Jong Bo Won, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/570,396

(22) PCT Filed: Dec. 14, 2015

(86) PCT No.: PCT/KR2015/013642
§ 371 (c)(1),
(2) Date: Oct. 30, 2017

(87) PCT Pub. No.: WO2016/182165
PCT Pub. Date: Nov. 17, 2016

(65) Prior Publication Data
US 2018/0147911 A1    May 31, 2018

(30) Foreign Application Priority Data

May 11, 2015  (KR) .................. 10-2015-0065261
May 11, 2015  (KR) .................. 10-2015-0065262

(51) Int. Cl.
*B60H 1/32*      (2006.01)
*B60H 1/00*      (2006.01)
(Continued)

(52) U.S. Cl.
CPC ..... *B60H 1/00264* (2013.01); *B60H 1/00021* (2013.01); *B60H 1/00057* (2013.01);
(Continued)

(58) Field of Classification Search
CPC ............ B60H 1/00264; B60H 1/00021; B60H 1/00678; B60H 1/3229;
(Continued)

(56) References Cited

U.S. PATENT DOCUMENTS 2,920,461 A * 1/1960 Atchison ............... F24F 1/02
                                                  62/325
5,038,577 A * 8/1991 Stanford ............... F24F 1/022
                                                  454/236
(Continued)

OTHER PUBLICATIONS

International Search Report and Written Opinion dated Mar. 14, 2016 from International Patent Application Serial No. PCT/KR2015/013642, with English translation of International Search Report.

*Primary Examiner* — Frantz F Jules
*Assistant Examiner* — Martha Tadesse
(74) *Attorney, Agent, or Firm* — Dickinson Wright PLLC (57) ABSTRACT

The present invention relates to an air conditioning system and, more particularly, to an air conditioning system comprising, within a single air conditioning case: a cool air passage in which an evaporator is installed; a warm air passage in which a condenser is installed; an installation space portion in which air conditioner parts such as a compressor are installed; and an air discharge passage for discharging, to the outside, air unnecessary for cooling and heating, thereby enabling attachment and detachment inside a vehicle, and enabling use as a portable air conditioner as well as a vehicle air conditioner. In addition, as the system is capable of cooling and heating, a separate heater core or PTC heater for heating is not required, thereby the structure is simple, and the system is capable of controlling cooling and heating modes through a single operation door, thereby allowing the system to be miniaturized.

13 Claims, 10 Drawing Sheets

(51) Int. Cl.
*F24F 13/20* (2006.01)
*F24F 13/30* (2006.01)
*F24F 1/02* (2019.01)
*F24F 1/04* (2011.01)

(52) U.S. Cl.
CPC ..... B60H 1/00514 (2013.01); B60H 1/00678 (2013.01); B60H 1/3229 (2013.01); F24F 1/02 (2013.01); F24F 1/04 (2013.01); F24F 13/20 (2013.01); F24F 13/30 (2013.01); *B60H 2001/00135* (2013.01); *B60H 2001/00178* (2013.01)

(58) Field of Classification Search
CPC ........ B60H 2001/00135; B60H 1/3226; B60H 2001/3292; B60H 1/00057; B60H 1/00514; B60H 2001/00178; F25D 17/08; F24F 1/02
See application file for complete search history.

(56) References Cited

U.S. PATENT DOCUMENTS

| | | | |
|---|---|---|---|
| 5,222,372 A | 6/1993 | DeRees et al. | |
| 5,386,704 A | 2/1995 | Benedict | |
| 5,975,191 A | 11/1999 | Ohashi et al. | |
| 2009/0193830 A1 | 8/2009 | Yoshioka | |
| 2009/0260386 A1* | 10/2009 | Wittmann | B60H 1/00921 62/324.2 |
| 2010/0000713 A1* | 1/2010 | Takahashi | B60H 1/00899 165/61 |
| 2013/0042637 A1 | 2/2013 | Richter et al. | |
| 2014/0069132 A1* | 3/2014 | Wong | F25B 30/02 62/238.6 |

* cited by examiner

FIG. 1

PRIOR ART

AIR CONDITIONING SYSTEM

CROSS-REFERENCE TO RELATED APPLICATIONS

This application is a U.S. National Stage of International Application No. PCT/KR2015/013642, filed Dec. 14, 2015, which claims the benefit and priority of KR 10-2015-0065261 filed May 11, 2015 and KR 10-2015-0065262 filed May 11, 2015. The entire disclosures of each of the above applications are incorporated herein by reference.

TECHNICAL FIELD

The present invention relates to an air conditioning system, and more particularly, to an air conditioning system, which includes a cold air passageway, in which an evaporator is mounted, a warm air passageway, in which a condenser is mounted, a mounting space part, in which air conditioner components such as a compressor are mounted, and an air discharge passageway, which is formed to discharge unnecessary air to the outside, in one air-conditioning case.

BACKGROUND ART

Figure 1:
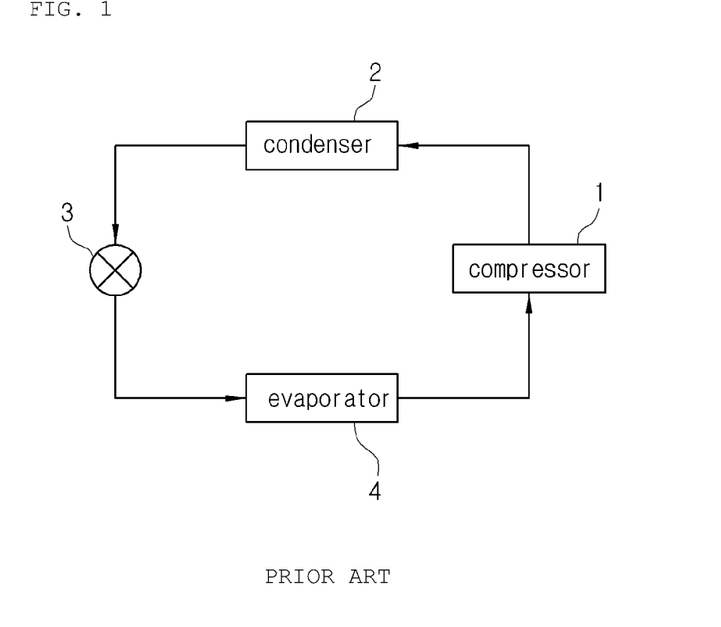
FIG. 1 is a configurative diagram of a refrigeration cycle of a general air conditioning system.

In general, as shown in FIG. 1, an air conditioning system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and evaporating the refrigerant to cool the air discharged to the interior of the vehicle due to heat absorption by evaporative latent heat, and that the compressor 1, the condenser 2, the expansion valve 3 and the evaporator 4 are connected with each other via refrigeration pipes. The air conditioning system cools the interior of the vehicle through the following refrigerant circulation process.

When a cooling switch (not shown) of the air conditioning system is turned on, first, the compressor 1 inhales and compresses gas-phase refrigerant of low-temperature and low-pressure while driving by driving power of an engine or a motor, and then sends the refrigerant in the gaseous phase of high-temperature and high-pressure to the condenser 2. Then, the condenser 2 condenses the gas-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the gas-phase refrigerant is inhaled into the compressor 1, and then, recirculates the refrigeration cycle as described above.

In case of an air conditioning system for a vehicle, the evaporator is mounted inside an air-conditioning case mounted inside the vehicle to serve for cooling. Namely, the air blown by a blower (not shown) is cooled by evaporative latent heat of the liquid-phase refrigerant circulating inside the evaporator 4 and discharged to the interior of the vehicle in a cooled state so as to cool the interior of the vehicle.

Moreover, heating of the interior of the vehicle is achieved by using a heater core (not shown) which is mounted inside the air-conditioning case and in which engine coolant circulates or by using a PTC heater (not shown) which is mounted inside the air-conditioning case.

Furthermore, the condenser 2 is mounted at the front end of an engine room in order to discharge air, which is heated by heat-exchange with driving wind, and the compressor 1 is arranged inside the engine room because it is operated by an engine driving belt.

In the meantime, an anti-start air conditioning system using an electric driver compressor is installed on the outside of the vehicle, such as the ceiling of the vehicle, in order to supply cooled air to the interior of the vehicle in a parking or stopping state (engine-off state).

Such an anti-start air conditioning system is disclosed in Korean Patent No. 10-1399253. In brief, the anti-start air conditioning system includes a compressor driven by receiving electric power from a vehicle battery, a condenser receiving box which is mounted to be spaced apart from an engine room, and a condenser which is mounted inside the condenser receiving box together with the compressor. The condenser receiving box includes a ventilation unit disposed on the front surface thereof and a partition wall disposed therein to divide right and left spaces. The condenser is mounted at one of the right and left spaces divided by the partition wall inside the condenser receiving box, and the compressor and a controller are mounted at the other space. The evaporator is mounted in the interior of the vehicle to supply cooled air to the interior of the vehicle.

However, the conventional anti-start air conditioning system has just the cooling function, and in order to add the heating function to the anti-start air conditioning system, a heater core or a PTC heater must be mounted therein. However, if the heater core or the PTC heater is added, the conventional anti-start air conditioning system has a disadvantage in that the system becomes complicated due to a coolant piper connection problem.

Additionally, the conventional anti-start air conditioning system has another disadvantage in that it is difficult to make the system small-sized due to the complicated structure and it is impossible to carry it portably because it must be installed on a vehicle.

DISCLOSURE

Technical Problem

Accordingly, the present invention has been made in an effort to solve the above-mentioned problems occurring in the prior arts, and it is an object of the present invention to provide an air conditioning system which includes a cold air passageway, in which an evaporator is mounted, a warm air passageway, in which a condenser is mounted, a mounting space part, in which air conditioner components, such as a compressor, are mounted, and an air discharge passageway, which discharges unnecessary air to the outside, in one air-conditioning case, thereby being available not only as an air conditioner for a vehicle but also as a portable air conditioner because it is detachably mounted inside a vehicle, being capable of providing both cooling and heating functions in a simple structure without needing a heater core or a PTC heater for heating, and being made in a small size because being capable of controlling a cooling mode and a heating mode through one operation door.

Technical Solution

To achieve the above objects, the present invention provides an air conditioning system, in which a compressor, a condenser, expansion means and an evaporator are connected with one another in order by a refrigerant circulation line, the air conditioning system including: an air-conditioning case having a cold air passageway in which the evaporator is mounted, a warm air passageway in which the condenser is mounted, and a mounting space part in which the compressor is mounted, the cold air passageway, the warm air passageway and the mounting space part being dividedly formed inside the air-conditioning case by partition walls; a blower unit mounted in the air-conditioning case to make air flow into the cold air passageway and the warm air passageway; and an air discharge passageway formed in the air-conditioning case in order to discharge air unnecessary for cooling or heating, out of the air passing through the cold air passageway and the air passing through the warm air passageway depending on a cooling mode or a heating mode, to the outside of the air-conditioning case.

Advantageous Effects

According to the present invention, the air conditioning system according to an embodiment of the present invention includes: the cold air passageway, in which the evaporator is mounted; the warm air passageway, in which the condenser is mounted; the mounting space part, in which air conditioner components such as the compressor are mounted; and the air discharge passageway, which discharges unnecessary air to the outside, in one air-conditioning case, so that the air conditioning system is available not only as an air conditioner for a vehicle but also as a portable air conditioner because it is detachably mounted inside a vehicle.

Moreover, the air conditioning system according to an embodiment of the present invention is capable of providing both cooling and heating functions in a simple structure without needing a heater core or a PTC heater for heating, and being made in a small size.

Furthermore, the air conditioning system according to an embodiment of the present invention has a simple structure and is capable of being made in a small size because it can control the cooling mode and the heating mode and open and close the air discharge passageway by just one operation door.

Additionally, the air conditioning system according to an embodiment of the present invention may transfer the same air volume in the cooling mode and the heating mode because the distance that the air cooled through the evaporator is transferred to a user and the air heated through the condenser is transferred to the user are equal.

In addition, the air conditioning system according to an embodiment of the present invention may reduce noise from the compressor by attaching a sound-absorbing material on the inner surface of the mounting space part of the air-conditioning case.

Moreover, because the air conditioning system includes the cold air passageway, in which the evaporator is mounted, the warm air passageway, in which the condenser is mounted, and the mounting space part, in which air conditioner components such as the compressor are mounted, in one of the spaces divided by the partition wall which divides the inside of the air-conditioning case, and electronic units mounted in the other space divided by the partition wall to control the air conditioning system, so that the air conditioning system may easily intercept electromagnetic waves of the electronic units and automatically regulate temperature through the electronic units.

MODE FOR INVENTION

Reference will be now made in detail to the preferred embodiment of the present invention with reference to the attached drawings.

Figure 2:
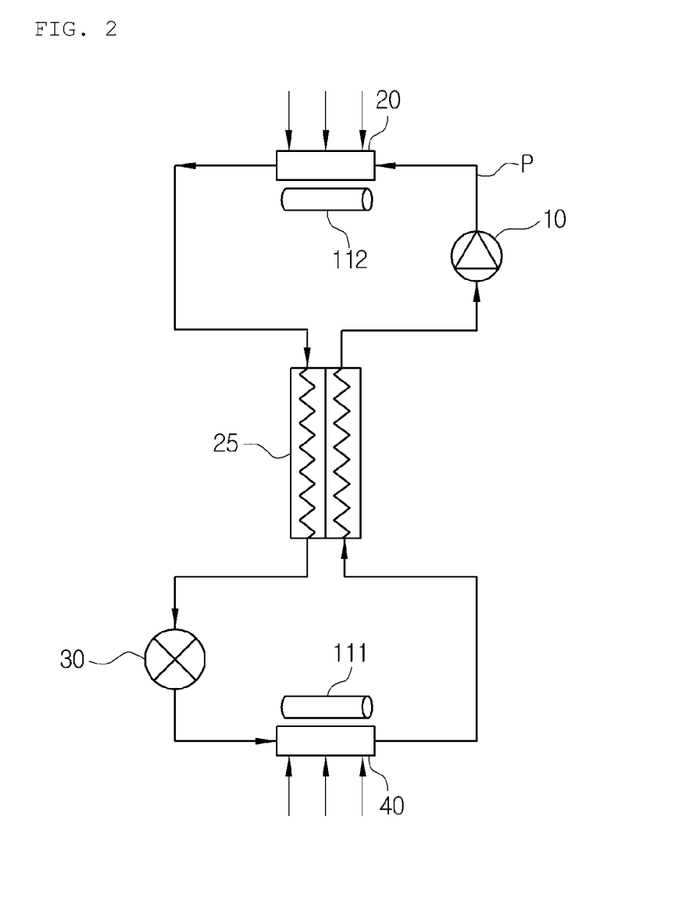
FIG. 2 is a configurative diagram of a refrigeration cycle of an air conditioning system according to an embodiment of the present invention.

As shown in the drawings, an air conditioning system according to a preferred embodiment of the present invention is configured of a compressor 100, a condenser 20, expansion means 30, and an evaporator 40 which are connected by a refrigerant pipe P in order. The air conditioning system carries out cooling through the evaporator 40 and carries out heating through the condenser 20, and may be mounted at a specific position of a vehicle or may be used portably during outdoor activities because being in a single module to be easily attached and detached. Hereinafter, as an example, the state where it is installed in a vehicle will be described.

First, the compressor 10 is an electric drive compressor working by receiving driving power from a motor, and absorbs and compresses gas-phase refrigerant of low-temperature and low-pressure discharged from the evaporator 40, and then, discharges it into a gaseous state of high-temperature and high-pressure to the outside.

The condenser 20 exchanges heat between the gas-phase refrigerant of high-temperature and high-pressure, which is discharged from the compressor 10 and flows inside the condenser 20, and air passing through the condenser 20, and in this process, the refrigerant is condensed and the air is heated and changed into warm air.

The condenser 20 may have a structure that a radiation fin (not shown) is mounted after a refrigerant circulation line or a refrigerant pipe (P) is in a zigzag form or a structure that a plurality of tubes (not shown) are stacked one on another and a radiation fin is mounted between the tubes.

Therefore, the gas-phase refrigerant of high-temperature and high-pressure discharged from the compressor 10 is condensed by exchanging heat with air while flowing along the refrigerant circulation line (P) of the zigzag form or along the tubes, and in this instance, the air passing through the condenser 20 is heated to be changed into warm air.

Moreover, the expansion means 30 rapidly expands the liquid-phase refrigerant discharged from the condenser 20 by a throttling action and sends the refrigerant to the evaporator 40 in a wet-saturated state of low-temperature and low-pressure.

The expansion means 30 may be a mechanical expansion valve or an electronic expansion valve, and may use an orifice structure.

The evaporator 40 evaporates the liquid-phase refrigerant of low-pressure by exchanging heat between the liquid-phase refrigerant of low-pressure, which flows in the evaporator 40 after being discharged from the expansion means 30, and the air inside the air-conditioning case 100, so that the air is cooled due to heat absorption by evaporative latent heat of the refrigerant.

Continuously, the gas-phase refrigerant of low-temperature and low-pressure discharged after being evaporated from the evaporator 40 is inhaled to the compressor 10, and then, recirculates the above-mentioned cycle.

Figure 5:
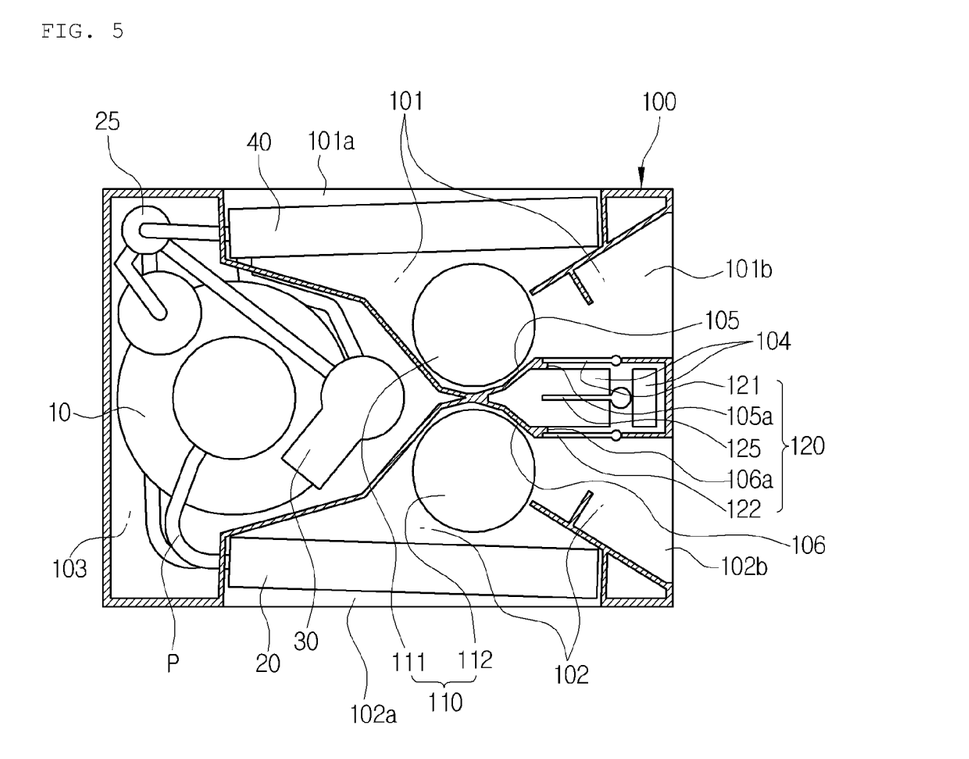
FIG. 5 is a sectional view of the air conditioning system according to the embodiment of the present invention.

Furthermore, in the above-mentioned refrigerant circulation process, cooling is achieved through the process that the air flowing in a cold air passageway 101 inside an air-conditioning case 100 is cooled by evaporative latent heat of the liquid-phase refrigerant, which circulates the inside of the evaporator 40, while passing through the evaporator 40 and is discharged out in a cooled state, when a blower unit 110 is operated.

Heating is achieved is achieved through the process that the air flowing in a warm air passageway 102 inside an air-conditioning case 100 is heated by radiation of heat of the gas-phase refrigerant of high-temperature and high-pressure, which circulates the inside of the condenser 20, while passing through the condenser 20 and is discharged out in a heated state, when the blower unit 110 is operated.

In the meantime, in the refrigerant circulation line (P), an internal heat exchanger 25 which exchanges heat between the refrigerant discharged from the condenser 20 and the refrigerant discharged from the evaporator 40 in order to improve cooling and heating functions.

Preferably, the internal heat exchanger 25 may be a heat exchanger of a dual pipe structure.

Figure 3:
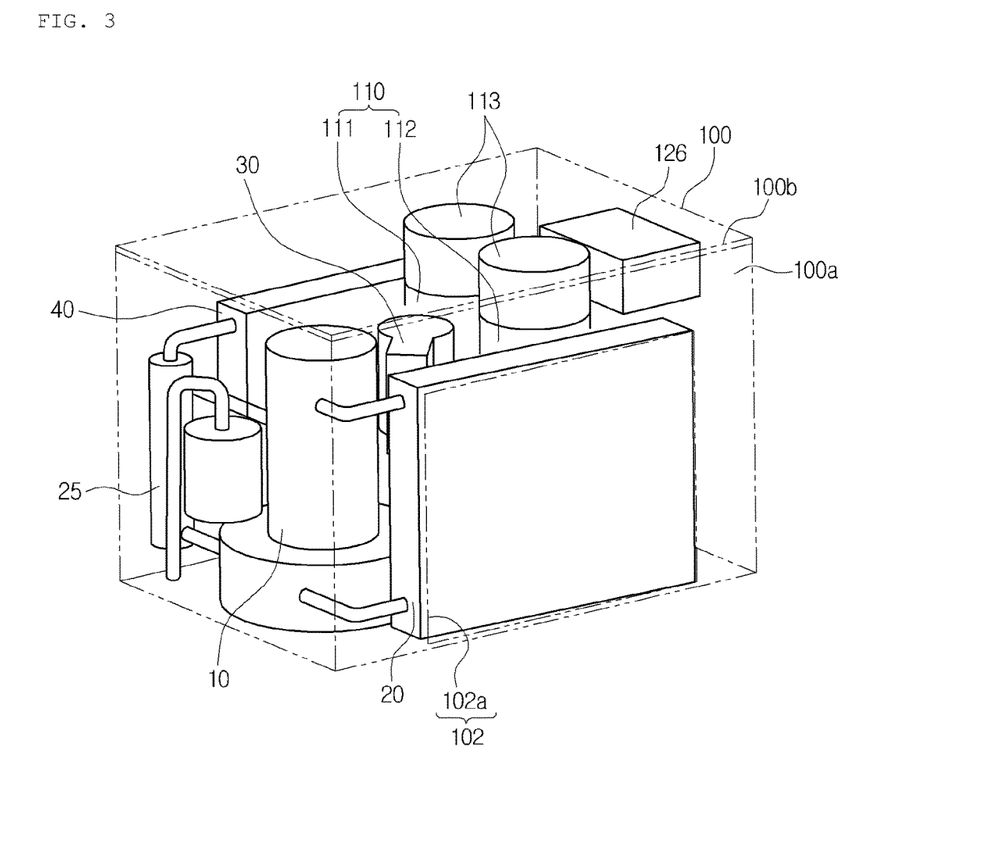
FIG. 3 is a perspective view of the air conditioning system according to the embodiment of the present invention.

Moreover, as shown in the drawings, the air-conditioning case 100 may have a parallelepiped shape, but may have one of other various shapes.

Additionally, the air-conditioning case 100 includes a lower case 100a on which components of the air conditioning system are mounted and a cover 100b disposed to cover the opened upper part of the lower case 100a.

Furthermore, the air-conditioning case 100 may be divided into a cold air passageway 101, in which the evaporator 40 is mounted, a warm air passageway 102, in which the condenser 20 is mounted, and a mounting space part 103, in which the compressor 10 is mounted, by partition walls 105 and 106 formed inside the air-conditioning case 100.

The cold air passageway 101 and the warm air passageway 102 are formed to be opposed to each other inside the air-conditioning case 100 and are symmetrical to each other.

The mounting space part 103 is formed at one side of the cold air passageway 101 and the warm air passageway 102 inside the air-conditioning case 100, namely, is formed at one end portion of the air-conditioning case 100.

In this instance, some of the mounting space part 103 may expand to a space between the cold air passageway 101 and the warm air passageway 102.

Meanwhile, not only the compressor 10 but also the internal heat exchanger 25 and the expansion means 30 are mounted in the mounting space part 103.

Figure 4:
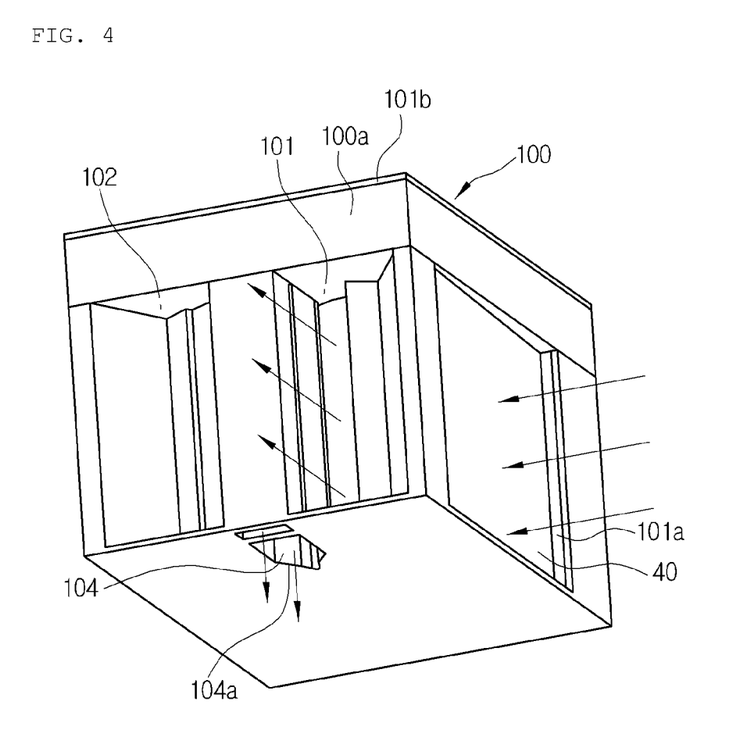
FIG. 4 is a perspective view viewed from the bottom of an air-conditioning case of the air conditioning system according to the embodiment of the present invention.

Moreover, an outlet 101b of the cold air passageway 101 and an outlet 102b of the warm air passageway 102 are formed at the opposite side of the mounting space part 103 in the air-conditioning case 100, and an inlet 101a of the cold air passageway 101 and an inlet 102a of the warm air passageway 102 are formed at both opposite sides of the air-conditioning case 100, in which the cold air passageway 101 and the warm air passageway 102 are located.

Furthermore, the evaporator 40 is mounted at the inlet 101a of the cold air passageway 101, and the condenser 20 is mounted at the inlet 102a of the warm air passageway 102.

Additionally, a distance from the evaporator 40 of the cold air passageway 101 to the outlet of the cold air passageway 101 and a distance from the condenser 20 of the warm air passageway 102 to the outlet of the warm air passageway 102 are equal.

Therefore, because the distance that the air cooled through the evaporator 40 is transferred to a user and the distance that the air heated through the condenser 20 is transferred to the user are the equal, the same air volume is transferred in the cooling mode and the heating mode.

In addition, the blower unit 110 for flowing air to the cold air passageway 101 and the war air passageway 102 is mounted in the air-conditioning case 100.

The blower unit 110 includes a first blast fan 111 mounted at the downstream side of the evaporator 40 inside the cold air passageway 101 and a second blast fan 112 mounted at the downstream side of the condenser 20 inside the warm air passageway 102.

In this instance, the first blast fan 111 and the second blast fan 112 are mounted to be opposed to each other.

Preferably, the first and second blast fans 111 and 112 may be cross flow fans to keep low noise when they are mounted on the vehicle and are actuated.

Moreover, a motor 113 is mounted inside the air-conditioning case 100 in order to operate the first and second blast fans 111 and 112.

Furthermore, an air discharge passageway 104 is formed in the air-conditioning case 100 to discharge air unnecessary for cooling or heating, out of the air passing through the cold air passageway 101 and the air passing through the warm air passageway 102 depending on a cooling mode or a heating mode, to the outside of the air-conditioning case 100.

That is, in the cooling mode, only the air passing through the cold air passageway 101 is supplied to the user and the air passing through the warm air passageway 102 is discharged to the outside. On the contrary, in the heating mode, only the air passing through the warm air passageway 102 is supplied to the user and the air passing through the cold air passageway 101 is discharged to the outside.

The air discharge passageway 104 is formed between the cold air passageway 101 and the warm air passageway 102. Therefore, because the air discharge passageway 104 is used commonly when the user wants to discharge the air passing through the cold air passageway 101 to the outside or to discharge the air passing through the warm air passageway 102 to the outside, the air conditioning system according to the preferred embodiment of the present invention may be made in a small size due to its simple structure of the passageway.

In the meantime, an outlet 104a of the air discharge passageway 104 is formed at the side, which is perpendicular to the side at which inlets 101a and 102a of the cold and warm air passageways 101 and 102 are formed, in the air-conditioning case 100. Therefore, the direction of the air discharged to the outside through the air discharge passageway 104 is at right angles to the direction of the air discharged through the cold and warm air passageways 101 and 102.

Moreover, the partition wall 105 formed between the cold air passageway 101 and the air discharge passageway 104 has a cold air communication hole 105a formed to communicate the cold air passageway 101 and the air discharged passageway 104 with each other, and the partition wall 106 formed between the warm air passageway 102 and the air discharge passageway 104 has a warm air communication hole 106a formed to communicate the warm air passageway 102 and the air discharge passageway 104.

The cold air communication hole 105a is formed on the partition wall 105 below the blower unit 110, which makes the air flow to the cold air passageway 101, and the warm air communication hole 106a is formed on the partition wall 106 below the blower unit 110, which makes the air flow to the warm air passageway 102.

In this instance, the cold air communication hole 105a and the warm air communication hole 106a are respectively formed at opposite positions of the partition walls 105 and 106 of both sides of the air discharge passageway 104.

Moreover, the air-conditioning case 100 has opening and closing means 120 for opening and closing the cold air passageway 101 and the cold air communication hole 105a and opening and closing the warm air passageway 102 and the warm air communication hole 106a depending on the cooling mode and the heating mode.

In other words, in the cooling mode, the cold air communication hole 105a is closed and the warm air communication hole 106a is opened by the opening and closing means 120, so that the air flowing through the cold air passageway 101 is supplied to the user and the air flowing through the warm air passageway 102 is discharged to the outside through the warm air communication hole 106a and the air discharge passageway 104.

In the heating mode, the warm air communication hole 106a is closed and the cold air communication hole 105a is opened by the opening and closing means 120, so that the air flowing through the warm air passageway 102 is supplied to the user and the air flowing through the cold air passageway 101 is discharged to the outside through the cold air communication hole 105a and the air discharge passageway 104.

The opening and closing means 120 includes: a cold air mode door 121 which is mounted at the cold air communication hole 105a to open and close the cold air passageway 101 and the cold air communication hole 105a; and a warm air mode door 122 which is mounted at the warm air communication hole 106a to open and close the warm air passageway 102 and the warm air communication hole 106a.

The cold air mode door 121 is mounted to elastically close the cold air communication hole 105a.

The warm air mode door 122 is mounted to elastically close the warm air communication hole 106a.

In other words, an elastic member (not shown) such as a spring is mounted between the cold air mode door 121 and the partition wall 105 so as to maintain the state where the cold air mode door 121 elastically closes the cold air communication hole 105a, and an elastic member (not shown) such as a spring is mounted between the warm air mode door 122 and the partition wall 106 so as to maintain the state where the warm air mode door 122 elastically closes the warm air communication hole 106a.

Additionally, the cold air mode door 121 is mounted to be opened in the direction of the cold air passageway 101 from the cold air communication hole 105a, and the warm air mode door 122 is mounted to be opened in the direction of the warm air passageway 102 from the warm air communication hole 106a.

In addition, an operation door 125 is mounted at the air discharge passageway 104 to operate the cold air mode door 121 and the warm air mode door 122 by pushing the cold air mode door or the warm air mode door depending on the cooling mode or the heating mode.

The operation door 125 is rotatably mounted in the middle of the air discharge passageway 104, and an actuator 126 is mounted inside the air-conditioning case 100 to actuate the operation door 125 at a predetermined angle to be rotatable.

Therefore, in the cooling mode, when the operation door 125 rotates toward the warm air communication hole 106a, it pushes the warm air mode door 122, which closes the warm air communication hole 106a, and in this instance, the warm air mode door 122 opens the warm air communication hole 106a and closes the warm air passageway 102. So, the air flowing through the cold air passageway 101 is supplied to the user, and the air flowing through the warm air passageway 102 is discharged to the air discharge passageway 104 through the opened warm air communication hole 106a.

In the heating mode, when the operation door 125 rotates toward the cold air communication hole 105a, it pushes the cold air mode door 121, which closes the cold air communication hole 105a, and in this instance, the cold air mode door 121 opens the cold air communication hole 105a and closes the cold air passageway 101. So, the air flowing through the warm air passageway 102 is supplied to the user, and the air flowing through the cold air passageway 101 is discharged to the air discharge passageway 104 through the opened cold air communication hole 105a.

In the meantime, when the operation door 125 operates the warm air mode door 122, the cold air mode door 121 closes the cold air communication hole 105a by elasticity of the elastic member. When the operation door 125 operates the cold air mode door 121, the warm air mode door 122 closes the warm air communication hole 106a by elasticity of the elastic member.

As described above, the air conditioning system is simple in structure and may be made in small size because it can control the cooling and heating modes and open and close the air discharge passageway 104 by just one operation door 125.

Moreover, a sound-absorbing material (not shown) is attached to the inner surface of the mounting space part 103 of the air-conditioning case 100 so as to reduce noise from the compressor 10.

Figure 6:
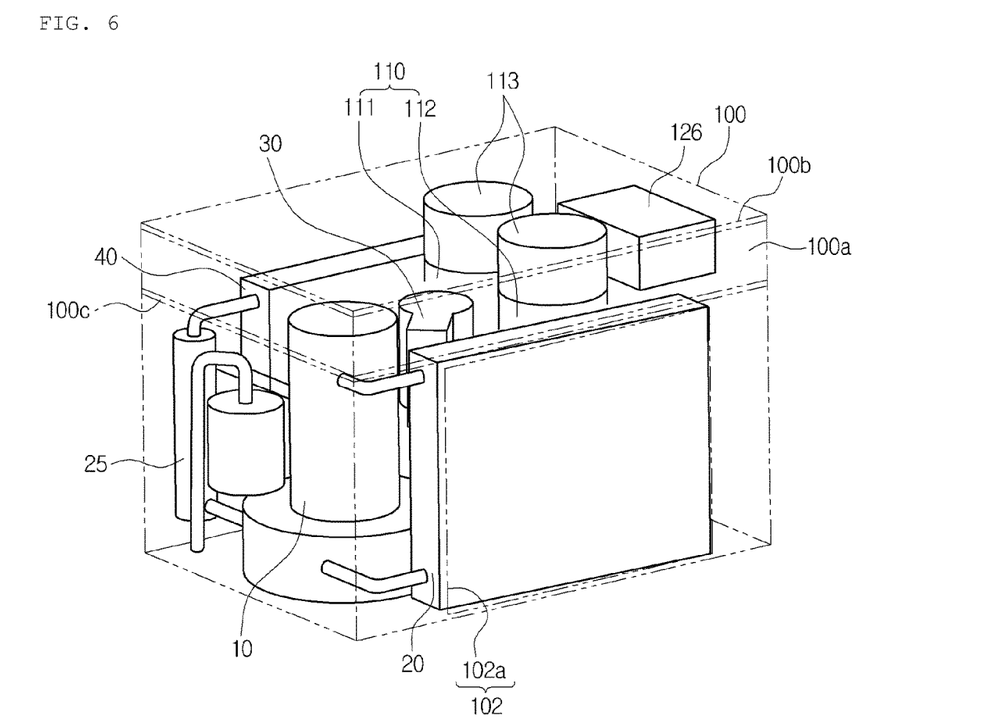
FIG. 6 is a perspective view showing a state where the inside of the air-conditioning case of the air conditioning system according to the embodiment of the present invention is divided by a partition wall.
Figure 7:
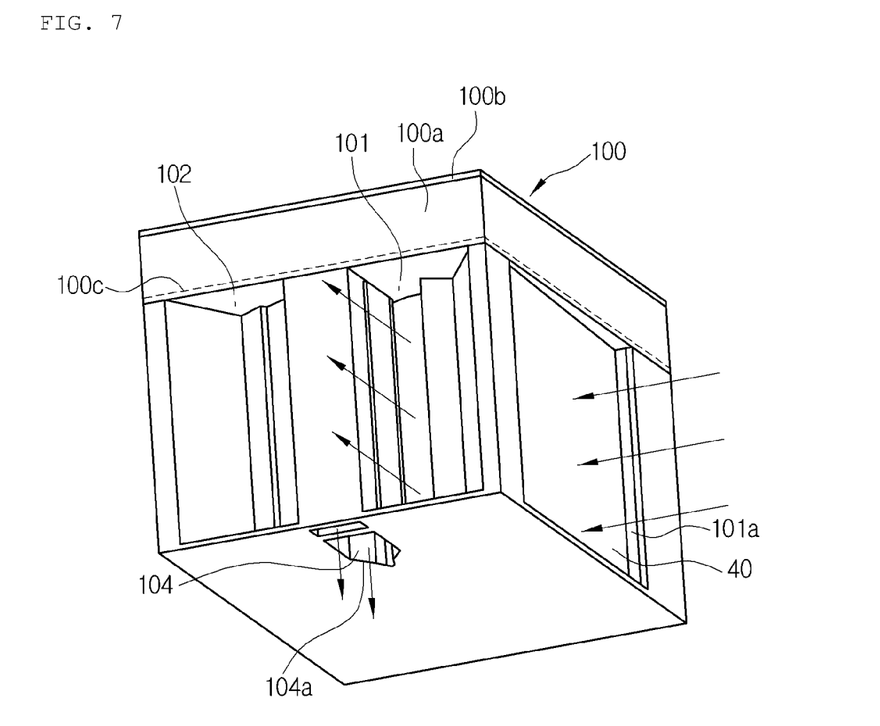
FIG. 7 is a perspective view viewed from the bottom of the air-conditioning case of the air conditioning system according to the embodiment of the present invention of FIG. 6.
Figure 8:
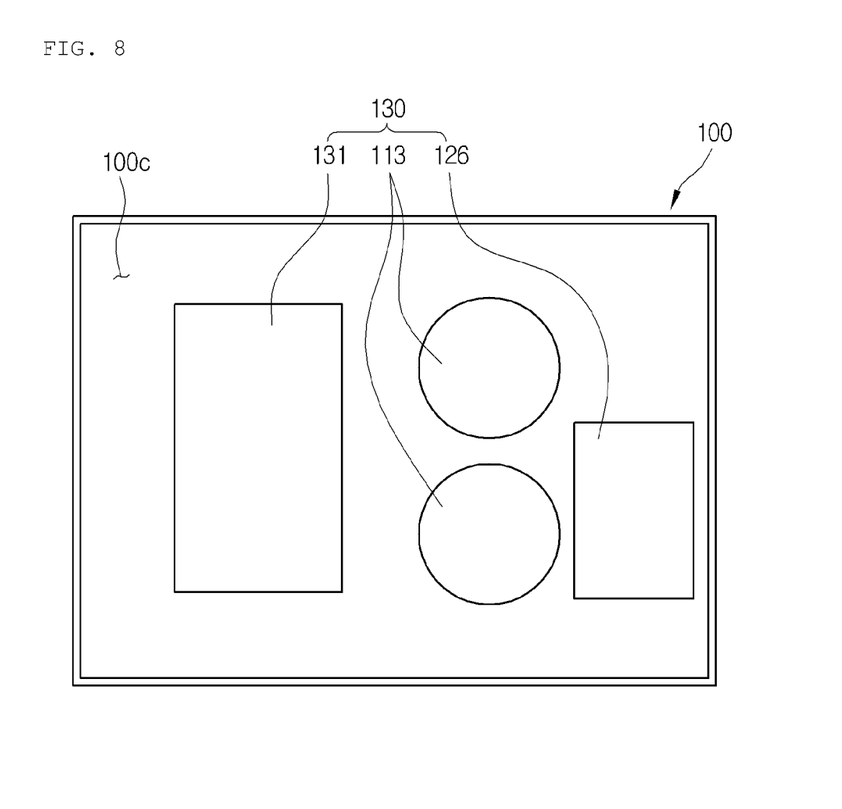
FIG. 8 is a plan view showing a part where electronic units are mounted in FIG. 6.

FIG. 6 is a perspective view showing a state where the inside of the air-conditioning case of the air conditioning system according to an embodiment of the present invention is divided by a partition wall, FIG. 7 is a perspective view viewed from the bottom of the air-conditioning case of the air conditioning system according to the embodiment of the present invention of FIG. 6, and FIG. 8 is a plan view showing a part where electronic units are mounted in FIG. 6.

Now, different parts from the parts of the air-conditioning case 100 according to the former embodiment will be described. The inside of the air-conditioning case 100 illustrated in FIGS. 6 to 8 is divided by a partition wall 100c.

That is, the air-conditioning case 100 includes: a cold air passageway 101, in which an evaporator 40 is mounted, a warm air passageway 102, in which a condenser 20 is mounted, and a mounting space part 103, in which a compressor 10 is mounted, in one of spaces of the air-conditioning case 100 divided by the partition wall 100c. Electronic units 130 for controlling the air conditioning system are mounted in the other space of the air-conditioning case 100 divided by the partition wall 100c.

The partition wall 100c is formed to divide the inside of the air-conditioning case 100 into an upper part and a lower part.

In this instance, the electronic units 130 are mounted at the upper part inside the air-conditioning case 100 divided by the partition wall 100c, and the components, such as the compressor 10, the condenser 20, expansion means 30 and the evaporator 40 are mounted at the lower part inside the air-conditioning case 100.

Meanwhile, the electronic units 130 are an inverter 131 for controlling the compressor 10, a motor 113 for operating the blower unit 110, and an actuator 126 for actuating the opening and closing means 120.

Therefore, the air conditioning system according to the embodiment of the present invention may easily intercept electromagnetic waves of the electronic units 130 when being controlled using an ECU of the vehicle because the electronic units 130 are mounted at the divided space inside the air-conditioning case 100.

Additionally, the air conditioning system may be automated in regulation of temperature using the electronic units 130.

Hereinafter, a refrigerant flow process of the air conditioning system according to the embodiment of the present invention will be described.

First, the gas-phase refrigerant of high-temperature and high-pressure compressed and discharged in the compressor 10 flows into the condenser 20.

The gas-phase refrigerant flown into the condenser 20 exchanges heat with the air passing through the condenser 20, and is phase-changed into a liquid phase while being cooled.

The liquid-phase refrigerant discharged from the condenser 20 exchanges heat with the refrigerant discharged from the evaporator 40 while passing through the internal heat exchanger 25, and then, flows into the expansion means 30 to be decompressed and expanded.

The refrigerant decompressed and expanded in the expansion means 30 becomes into an atomized state of low-temperature and low-pressure and flows into the evaporator 40, and the refrigerant flowing into the evaporator 40 exchanges heat with the air passing through the evaporator 40 to be evaporated.

After that, the refrigerant of low-temperature and low-pressure discharged from the evaporator 40 exchanges heat with the refrigerant discharged from the condenser 20 while passing through the internal heat exchanger 25, flows into the compressor 10, and then, recirculates the above-mentioned refrigeration cycle.

Hereinafter, the air flow processes in the cooling mode and in the heating mode will be described.

A. Cooling Mode

Figure 9:
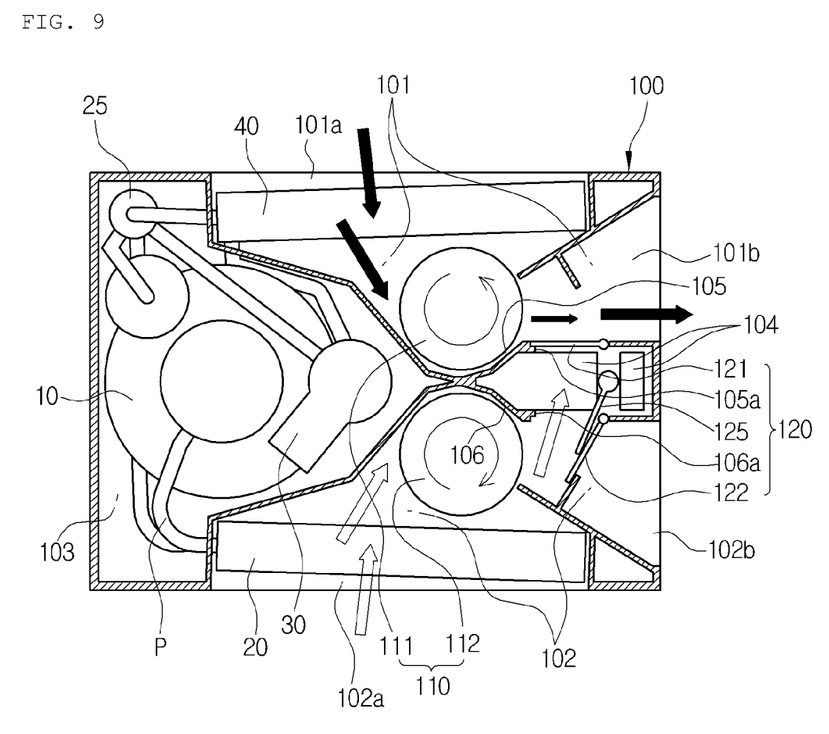
FIG. 9 is a sectional view showing a cooling mode state of the air conditioning system according to the embodiment of the present invention.

As shown in FIG. 9, in the cooling mode, when the operation door 125 rotates toward the warm air communication hole 106a, it pushes the warm air mode door 122, which closes the warm air communication hole 106a, and in this instance, the warm air mode door 122 opens the warm air communication hole 106a and closes the warm air passageway 102.

Moreover, the cold air mode door 121 keeps the closed state of the cold air communication hole 105a by elasticity of the elastic member.

Therefore, when the first and second blast fans 111 and 112 are operated, airs are respectively inhaled to the cold air passageway 101 and the warm air passageway 102.

The air inhaled to the cold air passageway 101 is cooled while passing through the evaporator 40, and then, is discharged through the outlet 101a of the cold air passageway 101 to cool indoors.

On the contrary, the air inhaled to the warm air passageway 102 is heated while passing through the condenser 20, and then, is discharged to the outside through the warm air communication hole 106a and the air discharge passageway 104.

B. Heating Mode

Figure 10:
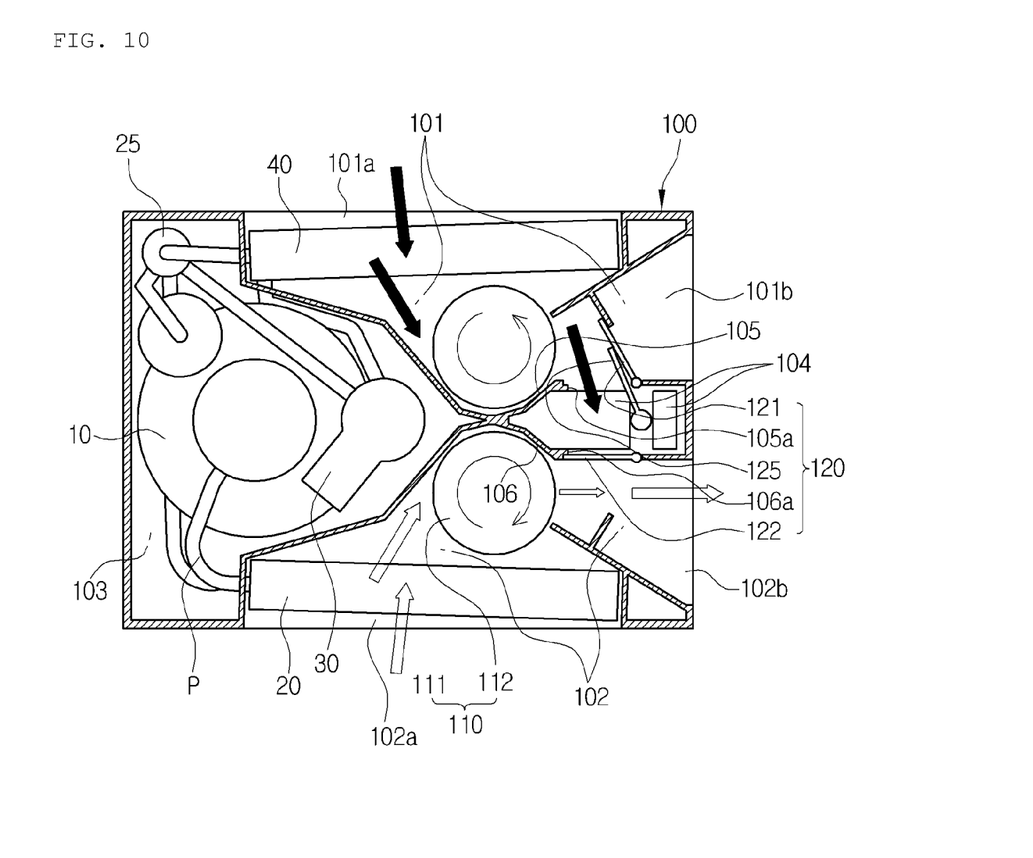
FIG. 10 is a sectional view showing a heating mode state of the air conditioning system according to the embodiment of the present invention.

As shown in FIG. 10, in the heating mode, when the operation door 125 rotates toward the cold air communication hole 105a, it pushes the cold air mode door 121, which closes the cold air communication hole 105a, and in this instance, the cold air mode door 121 opens the cold air communication hole 105a and closes the cold air passageway 101.

Moreover, the warm air mode door 122 closes the warm air communication hole 106a by elasticity of the elastic member.

Therefore, when the first and second blast fans 111 and 112 are operated, airs are respectively inhaled to the cold air passageway 101 and the warm air passageway 102.

The air inhaled to the warm air passageway 102 is heated while passing through the condenser 20, and then, is discharged through the outlet 102a of the warm air passageway 102 to heat indoors.

On the contrary, the air inhaled to the cold air passageway 101 is cooled while passing through the evaporator 40, and then, is discharged to the outside through the cold air communication hole 105a and the air discharge passageway 104.

The invention claimed is:

1. An air conditioning system, comprising: a compressor, a condenser, an expansion means, and an evaporator connected with one another in order by a refrigerant circulation line;
  an air-conditioning case having a cold air passageway in which the evaporator is mounted, a warm air passageway in which the condenser is mounted, and a mounting space part in which the compressor is mounted, the cold air passageway, the warm air passageway and the mounting space part being dividedly formed inside the air-conditioning case by partition walls;
  a blower unit mounted in the air-conditioning case to make air flow into the cold air passageway and the warm air passageway;
  an air discharge passageway which is formed in the air-conditioning case in order to discharge air unnecessary for cooling or heating, out of the air passing through the cold air passageway and the air passing through the warm air passageway depending on a cooling mode or a heating mode, to an outside of the air-conditioning case;

the air conditioning case further having an anterior side and a posterior side positioned opposite to one another, and a top side and a bottom side each extending between the anterior and posterior sides and positioned opposite to one another;

wherein an outlet of the cold air passageway and an outlet of the warm air passageway are both formed at the anterior side of the mounting space, and wherein an inlet of the cold air passageway is formed at the top side of the air conditioning case and an inlet of the warm air passageway is formed at the bottom side of the air conditioning case.

2. The air conditioning system according to claim 1, wherein the cold air passageway and the warm air passageway are formed to be opposed to each other inside the air-conditioning case, and wherein the mounting space part is formed adjacent to the posterior side of the cold and warm air passageways inside the air-conditioning case.

3. The air conditioning system according to claim 1, wherein the blower unit includes a first blast fan mounted at a downstream side of the evaporator inside the cold air passageway and a second blast fan mounted at a downstream side of the condenser inside the warm air passageway.

4. The air conditioning system according to claim 3, wherein the first and second blast fans are cross flow fans.

5. The air conditioning system according to claim 1, further including the air discharge passageway being formed in the air-conditioning case in between the cold and warm air passageways and separated from the cold and warm air passageways by the partition walls in order to discharge the air unnecessary for cooling or heating, out of the air passing through the cold air passageway and the air passing through the warm air passageway depending on a the cooling mode or the heating mode, to the outside of the air-conditioning case;

the partition walls defining a cold air communication hole connecting the cold air passageway and the air discharge passageway, and a warm air communication hole connecting the warm air passageway and the air discharge passageway;

a cold air mode door mounted at the cold air communication hole and moveable to open and close the cold air passageway, and a warm air door mounted at the warm air communication hole and moveable to open and close the warm air passageway, and wherein the cold air door is in an open position and the warm air door is in a closed position in the cooling mode, and wherein the cold air door is in a closed position and the warm air door is in an open position in the heating mode; and an operation door mounted at the air discharge passageway and moveable against the cold air mode door and the warm air mode door to cause the cold air mode door to open and close the cold air passageway and to cause the warm air mode door to open and close the warm air passageway to activate the cooling and heating modes.

6. The air conditioning system according to claim 5, wherein the cold air communication hole is formed on one of the partition walls below the blower unit, which makes the air flow to the cold air passageway, and wherein the warm air communication hole is formed on one of the partition walls below the blower unit, which makes the air flow to the warm air passageway.

7. The air conditioning system according to claim 5, wherein the cold air mode door is mounted to one of the partition walls and is biased toward a position that closes elastically close the cold air communication hole, wherein the warm air mode door is mounted to one of the partition walls and is biased toward a position that closes elastically close the warm air communication hole, and wherein an operation door is mounted at the air discharge passageway to operate the cold air mode door and the warm air mode door by pushing the cold air mode door or the warm air mode door depending on the cooling mode or the heating mode.

8. The air conditioning system according to claim 1, wherein the evaporator is mounted at the inlet of the cold air passageway and the condenser is mounted at the inlet of the warm air passageway, and wherein a distance from the evaporator of the cold air passageway to the outlet of the cold air passageway and a distance from the condenser of the warm air passageway to the outlet of the warm air passageway are equal.

9. The air conditioning system according to claim 1, wherein an internal heat exchanger, which exchanges heat between the refrigerant discharged from the condenser and the refrigerant discharged from the evaporator, and the expansion means are mounted in the mounting space part of the air-conditioning case.

10. The air conditioning system according to claim 5, wherein the cold air passageway, the warm air passageway and the mounting space part are formed in a first space of the air-conditioning case, electronic units for controlling the air conditioning system are mounted in a second space of the air-conditioning case, and wherein the first and second spaces of the air-conditioning case are separated from one another by the partition walls.

11. The air conditioning system according to claim 10, wherein the partition walls are formed to divide the inside of the air-conditioning case into an upper part and a lower part, and wherein the electronic units are mounted at the upper part inside the air-conditioning case divided by the partition walls.

12. The air conditioning system according to claim 10, wherein the electronic units are an inverter for controlling the compressor, a motor for operating the blower unit, and an actuator for actuating the operation door, which opens and closes the cold air passageway and the warm air passageway.

13. The air conditioning system as set forth in claim 1 wherein the anterior side defining the cold and warm air passageways is perpendicular to the top side defining the inlet of the cold air passageway and the bottom side defining the inlet of the warm air passageway.

* * * * *